(12) United States Patent
Hsu et al.

(10) Patent No.: US 9,939,921 B2
(45) Date of Patent: Apr. 10, 2018

(54) ELECTRONIC DEVICE KEYBOARD SPACEBAR WITH VISUAL FEEDBACK ASSOCIATED WITH LOCATION SENSING

(71) Applicant: Synaptics Incorporated, San Jose, CA (US)

(72) Inventors: Andrew Hsu, San Jose, CA (US); Raja Bose, San Jose, CA (US); Bjorn Hovden, San Jose, CA (US); Mark Huie, San Jose, CA (US); Justin Mockler, San Jose, CA (US); Mohamed Sheik-Nainar, San Jose, CA (US); Kipling Inscore, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 80 days.

(21) Appl. No.: 14/985,114

(22) Filed: Dec. 30, 2015

(65) Prior Publication Data

US 2017/0192527 A1 Jul. 6, 2017

(51) Int. Cl.
| | | |
|---|---|---|
| *G06F 3/02* | (2006.01) | |
| *G06F 3/041* | (2006.01) | |
| *G06F 3/044* | (2006.01) | |
| *G06F 3/023* | (2006.01) | |
| *H01H 13/83* | (2006.01) | |
| *G06F 3/0489* | (2013.01) | |
| *H01H 3/02* | (2006.01) | |

(52) U.S. Cl.
CPC .......... *G06F 3/0219* (2013.01); *G06F 3/0238* (2013.01); *G06F 3/044* (2013.01); *G06F 3/0416* (2013.01); *G06F 3/0489* (2013.01); *H01H 13/83* (2013.01); *H01H 2003/0293* (2013.01); *H01H 2219/037* (2013.01); *H01H 2219/039* (2013.01)

(58) Field of Classification Search
CPC .... G06F 3/0219; G06F 3/0238; G06F 3/0416; G06F 3/044; G06F 3/033; G06F 3/023; G06F 3/0213; H03K 17/94; H03K 17/962; H03K 17/9622; H03K 17/9631; H01H 13/83
See application file for complete search history.

(56) References Cited

U.S. PATENT DOCUMENTS

| | | | | |
|---|---|---|---|---|
| 8,692,784 B2* | 4/2014 | Cheng | .................... | G06F 3/0421 345/168 |
| 9,195,321 B2* | 11/2015 | Laubach | .............. | G06F 3/04895 |
| 2005/0073446 A1* | 4/2005 | Lazaridis | .............. | G06F 3/0202 341/22 |
| 2006/0245808 A1* | 11/2006 | Salman | .................. | G06F 3/0236 400/490 |
| 2007/0152972 A1* | 7/2007 | Zhang | ..................... | G06F 3/023 345/168 |

(Continued)

*Primary Examiner* — Jennifer Mehmood
*Assistant Examiner* — Sardis F Azongha
(74) *Attorney, Agent, or Firm* — FBFK PC (57) ABSTRACT

An input device includes a plurality of keys, where at least one key of the plurality of keys may include a first surface configured to contact a plurality of input objects, a sensing region of the first surface configured to sense the plurality of input objects, a capacitive sensor configured to determine positional information of the plurality of input objects on the first surface of the key, and a lighting element configured to provide visual feedback to a user interacting with the at least one key.

15 Claims, 4 Drawing Sheets

(56) References Cited

U.S. PATENT DOCUMENTS

| | | | | |
|---|---|---|---|---|
| 2008/0278352 A1* | 11/2008 | Henriksson | ............ | G06F 3/0238 341/22 |
| 2010/0302169 A1* | 12/2010 | Pance | .................. | G06F 3/0237 345/170 |
| 2011/0168532 A1* | 7/2011 | Tsai | ....................... | H01H 13/83 200/314 |
| 2011/0205161 A1* | 8/2011 | Myers | ..................... | G06F 3/016 345/169 |
| 2014/0218297 A1* | 8/2014 | Mortel | ................. | G06F 3/0233 345/168 |
| 2015/0103508 A1* | 4/2015 | Tan | ...................... | G06F 3/0219 362/23.03 |
| 2015/0160760 A1* | 6/2015 | Sato | ....................... | G06F 3/044 345/174 |
| 2016/0077734 A1* | 3/2016 | Buxton | ............... | G06F 3/04842 715/773 |
| 2016/0100465 A1* | 4/2016 | Prescott | ................. | A63F 13/22 345/170 |

* cited by examiner

ELECTRONIC DEVICE KEYBOARD SPACEBAR WITH VISUAL FEEDBACK ASSOCIATED WITH LOCATION SENSING

FIELD

This invention generally relates to electronic devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, one or more embodiments relate to an input device. The input device includes a plurality of keys, and at least one key of the plurality of keys includes a first surface configured to contact a plurality of input objects. The at least one key also includes a sensing region of the first surface configured to sense the plurality of input objects and a capacitive sensor configured to determine positional information of the plurality of input objects on the first surface of the at least one key. The at least one key also includes a lighting element configured to provide visual feedback to a user interacting with the at least one key.

In general, in one aspect, one or more embodiments relate to a processing system for an input device. The processing system includes a sensor module comprising circuitry coupled to a capacitive sensor, the sensor module configured to transmit transmitter signals and receive resulting signals with the capacitive sensor. The processing system includes a determination module comprising circuitry configured to determine positional information for a plurality input objects contacting a first surface of an input device. The determination module is configured to determine positional information of the plurality of input objects and to activate a lighting element of the input device to provide visual feedback to a user interacting with input device based on the positional information of the plurality of input objects.

In general, in one aspect, one or more embodiments relate to an electronic system. The electronic system includes a display device configured to display a graphical user interface and an input device that includes at least one key and a capacitive sensor operatively connected to a first surface of the at least one key having a sensing region. The electronic system includes a processing system communicatively coupled to the display device and the input device. The processing system of the electronic system is configured to determine positional information of a plurality of input objects on the first surface of the at least one key and to activate a lighting element to provide visual feedback to a user interacting with the at least one key based on positional information of the plurality of input objects.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements.

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
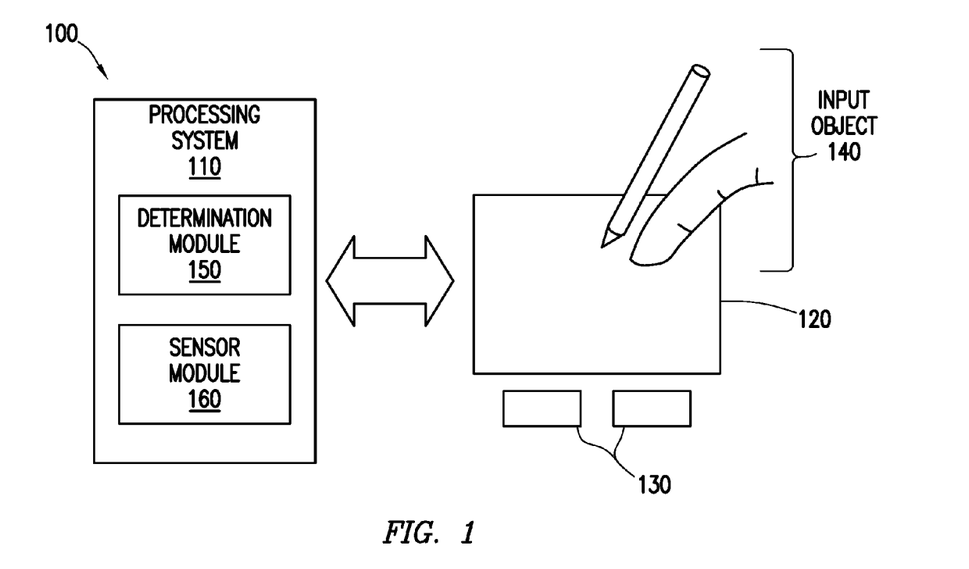
FIG. 1 is a block diagram of an example system that includes an input device in accordance with an embodiment of the invention.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects may exist in the sensing region (120). Further, the particular input objects are in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light-emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

It should be understood that while many embodiments of the invention are described in the context of a fully-functioning apparatus, the mechanisms of the present invention are capable of being distributed as a program product (e.g., software) in a variety of forms. For example, the mechanisms of the present invention may be implemented and distributed as a software program on information-bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

Figure 2:
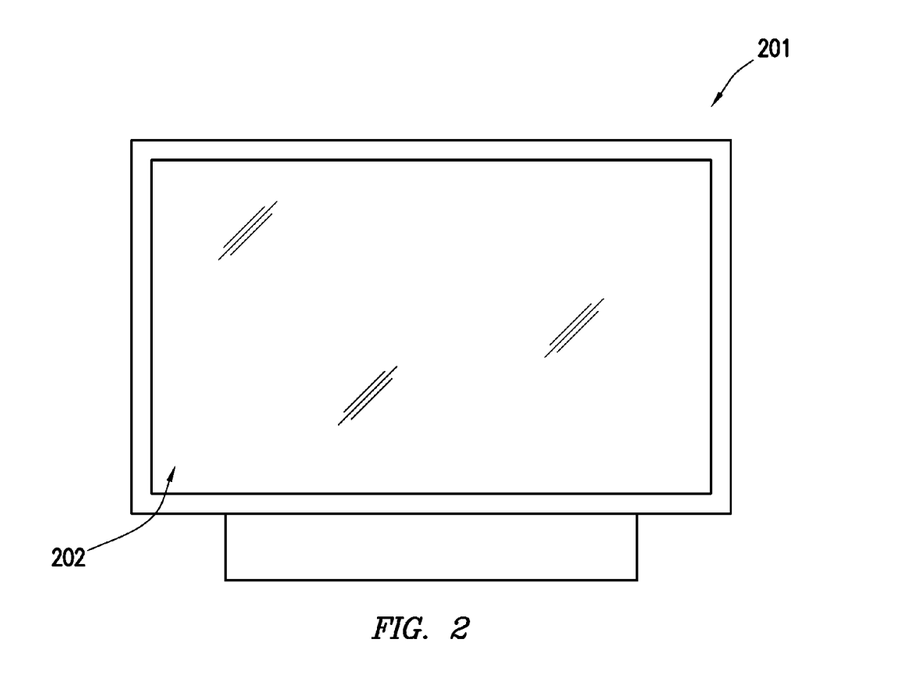
FIG. 2 is a diagram of an example display device to display a graphical user interface (GUI) in accordance with one or more embodiments of the invention.

FIG. 2 shows an example display device (201) to display a graphical user interface (GUI) (202) to a user in accordance with embodiments disclosed herein. In one or more embodiments, the processing system (110) of FIG. 1 may be operatively connected to the display device (201), and the processing system (110) may interact with the display device (201) and the GUI (202) to display one or more programs, applications, and/or menus to a user. In one or more embodiments, user interaction with an input device, e.g., the input device (120) of FIG. 1, such as through one or more input objects, e.g., the input object (140) of FIG. 1, may allow the user to manipulate what is shown on the display device (201) by the GUI (202), as will be explained further below.

As an overview, the various embodiments described herein provide advantages attainable from the multi-function keys that are capable of detecting and distinguishing between two types, three types, or more types of input. Some multi-function keys are capable of sensing multiple levels of key depression, key depression force, location of touch on the key surface, etc. Some multi-function keys are capable of sensing and distinguishing between non-press touch (contact) on a key and a press on the key. This distinction between a contact input and press input is referred to herein as the "state" of the key, i.e., contacted or pressed. Some multi-function keys are capable of distinguishing between one, two or more unique input objects interacting with the key, i.e., a multi-object press. In some embodiments, the related function activated (response provided) by a press input depends upon the number of objects used to provide the press input. That is, a press input provided by a single object will activate a first function while a press input provided by a multi-object press will activate a second function. In some embodiments, the second function is related to the first function. In other embodiments the second function is provided until the multi-object press is removed (the key released). In other embodiments, the second function remains activated until the key assembly receives the multi-object press again. Additionally, it will be appreciated that the second function may be activated upon release of a pressed key as opposed to being activated upon pressing the key with multiple objects.

Multi-function keys may be configured with a touch sensitive surface using sensor systems of any appropriate technology, including any one or combination of technologies described in this detailed description section or by the references noted in the background section. As a specific example, in some embodiments, a sensor system for a key comprises a capacitive sensing system capable of detecting touch on the key and presses of the key. As another specific example, in some embodiments, a sensor system for a key comprises a capacitive sensing system capable of detecting touch on the key and a resistive membrane switch system capable of detecting presses of the key.

Multi-function keys can be used to enhance user interfaces, such as improving ergonomics, speeding up entry, extending the functionality of the key, providing more intuitive operation, etc. For example, multi-function keys configured in keypads and keyboards that capable of detecting and distinguishing between a single finger touch input and multi-finger touch input press input may enable additional functionality using a same key.

A "non-press touch input" or "contact input" as used herein to indicate input approximating a user contacting a key surface but not pressing the key surface sufficiently to cause a press input. A "press input" is used herein to indicate a user pressing a key surface sufficiently to trigger the main entry function of the key, e.g., to trigger alphanumeric entry for alphanumeric keys. In some embodiments, the sensor system is configured to consider the following as non-press touch input: inputs that contact the key surface, those inputs that lightly touch but does not significantly press the key surface, those inputs that press on the key surface slightly but do not fully depress the key, or a combination of these.

Figure 3:
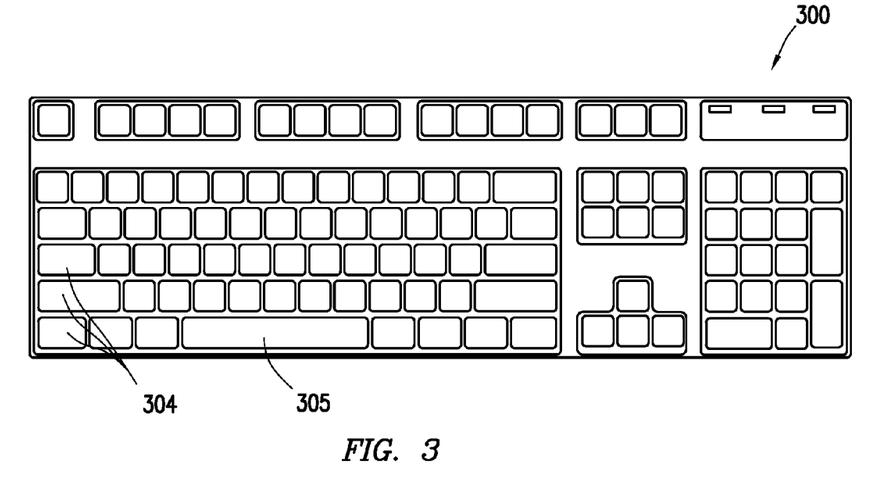
FIG. 3 is a diagram of an example input device in accordance with one or more embodiments of the invention.

FIG. 3 illustrates an input device (300), e.g., a keyboard, having a plurality of key assemblies, e.g., key assemblies (304). As can be seen the key assemblies (304) include a label or legend, e.g., Shift, Caps Lock, A-Z, 0-9, that identifies to a user the function provided by pressing a respective key. Some keyboards also include function keys that have more generic legends, e.g., F1, F2, that perform a function under control of a processing system or application program. In one or more embodiments, the function keys (304) can be programmed by the user to activate a programmed function or series of instructions, e.g., a macro. In one or more embodiments, the plurality of key assemblies (304) may also include at least one key (305), which, in one or more embodiments, may be a space bar. Some or all of the plurality of key assemblies (304) shown in FIG. 3 include a touch surface, as will be described further below.

Publishers of programs or applications may provide keyboard shortcuts to activate certain actions or functions. This may free the user from having to take a hand off the keyboard to use a mouse (or another navigation or input device) to locate and activate the function or action via one or more menus. Some publishers have extensive lists of keyboard shortcuts that may tax the memory and frustrate some users. Moreover, keyboard shortcuts may also vary from publisher to publisher, which may further frustrate some users if multiple programs are running and the user is switching between programs.

According to one or more embodiments, an input device may include a plurality of keys. As used herein, the term "key" may refer to the term "key assembly" discussed above. In one or more embodiments, at least one key of the plurality of keys includes a first surface configured to contact a plurality of input objects, a sensing region of the first surface configured to sense the plurality of input objects, a capacitive sensor configured to determine positional information of the plurality of input objects on the first surface of the key, and a lighting element configured to provide visual feedback to a user interacting with the at least one key.

Figure 4:
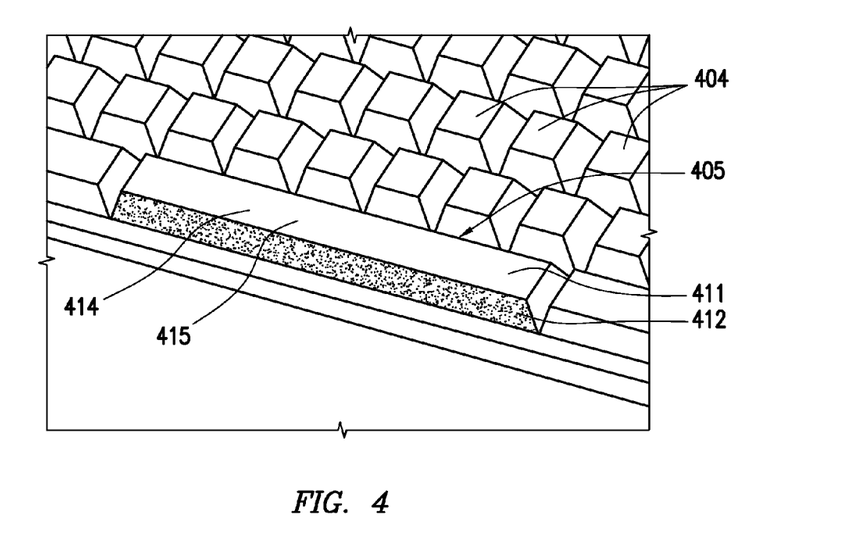
FIG. 4 is a perspective view of an example input device in accordance with one or more embodiments of the invention.

For example, referring to FIG. 4, an input device (400) is shown. As shown, the input device (400) is a keyboard and includes a plurality of keys (404), in which the plurality of keys (404) includes at least one key (405). Further, as shown, the at least one key (405) of the plurality of keys (404) is a space bar having a top surface (411) and a front surface (412). In one or more embodiments, at least one of the top surface (411) and the front surface (412) of the at least one key (405) may be configured to contact a plurality of input objects, e.g., the input objects (140) shown in FIG. 1.

In one or more embodiments, the top surface (411) of the at least one key (405) may include a sensing region (414) configured to sense the plurality of input objects discussed above. As shown, the sensing region (414) is found on the top surface (411) of the at least one key (405). However, in one or more embodiments, the sensing region (414) may be found on the top surface (411) and/or the front surface (412) of the at least one key (405).

Further, in one or more embodiments, the at least one key (405) may include a capacitive sensor (415). Embodiments disclose herein may include one or more capacitive sensors (415) as part of the at least one key (405), and the capacitive sensor (415) is configured to determine positional information of the plurality of input objects on the top surface (411) of the at least one key (405). In one or more embodiments, the capacitive sensor (415) may be disposed on or may be operatively connected to the sensing region (414) of the at least one key (405), which may allow the sensing region (414) to sense the plurality of input objects discussed above. As discussed above, the sensing region (414) may be found on the top surface (411) and/or the front surface (412) of the at least one key (405) in one or more embodiments. As such, in one or more embodiments, one or more capacitive sensors (415) may be disposed on or may be operatively connected to the top surface (411) and/or the front surface (412) of the at least one key (405).

In one or more embodiments, the top surface (411) of the at least one key (405) may be considered a first surface of the at least one key (405), and the front surface (412) of the at least one key (405) may be considered a second surface of the at least one key (405). Alternatively, in one or more embodiments, the front surface (412) of the at least one key (405) may be a first surface of the at least one key (405), and the top surface (411) of the at least one key (405) may be a second surface of the at least one key (405). In other words, in one or more embodiments, the sensing region (414) of the at least one key (405) may be found on a first surface and/or a second surface of the at least one key (405), and a first surface and/or a second surface of the at least one key (405) may be configured to sense a plurality of input objects.

In one or more embodiments, the capacitive sensor is configured to determine positional information of the plurality of input objects on both the first surface and the second surface of the at least one key. As such, in one or more embodiments, the capacitive sensor (415) may allow the sensing region (414) of the at least one key (405), e.g., the top surface (411) and/or the front surface (412), to be a gesture sensing area that can parse the direction and/or distance (and any changes to either) of a swipe by one or more input objects. Further, in one or more embodiments, the sensing region (414) of the at least one key (405) may include button areas, which may be activated by one or more input objects. Moreover, in one or more embodiments, meta keys on the at least one key (405) or elsewhere on the input device (400), e.g., another of the plurality of keys (404), may redefine the function of buttons, swipes, gestures, mouse actions, and/or other input device controls. In one or more embodiments, the input device (400) may also include a switch or a switch-like sensor, e.g., a tact switch, two-stage switch, or a force sensor, that may be placed so as to detect when the at least one key (405) is pressed in a forward direction, e.g., in a direction away from the user and toward the other keys of the plurality of keys (404). Such a switch would allow for complex interactions between one or more motions on the top surface (411) of the at least one key (405) by one or more input objects, one or more motions on the front surface (412) of the at least one key (405) by one or more input objects, pressing down on the at least one key (405), and pressing the at least one key (405) in the forward direction.

Figure 5A:
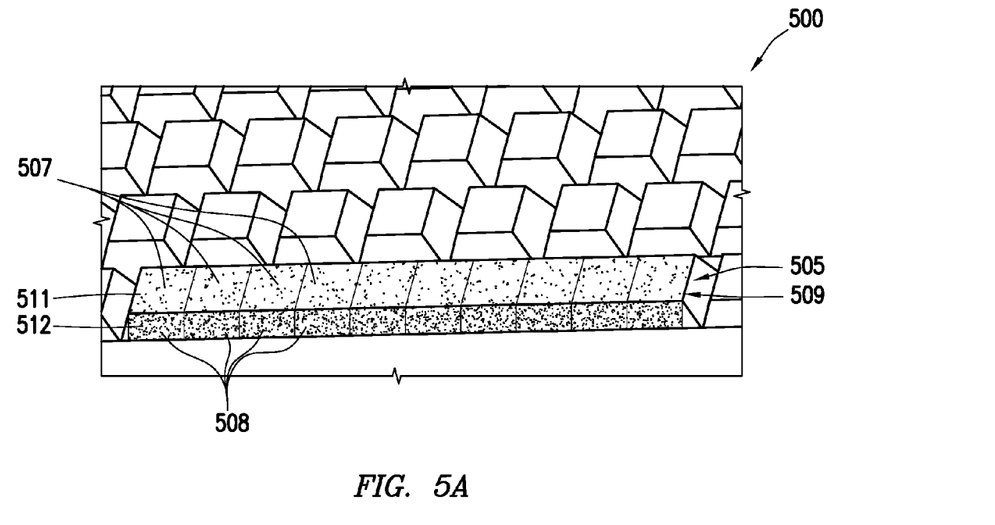
FIGS. 5A and 5B are perspective views of an example input device in accordance with one or more embodiments of the invention.
Figure 5B:
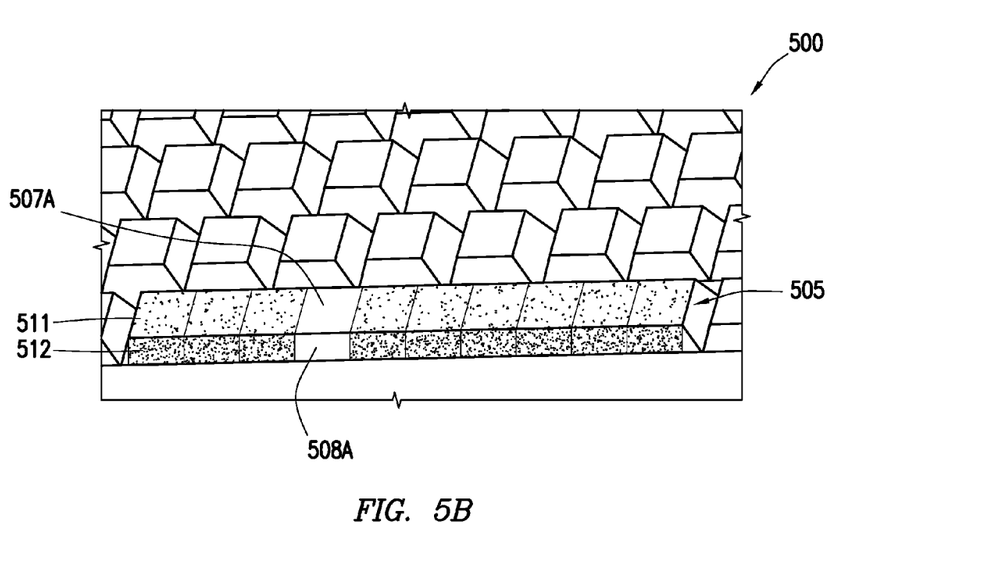

As discussed above, in one or more embodiments, the at least one key may include a lighting element configured to provide visual feedback to a user interacting with the at least one key. Referring now to FIGS. 5A and 5B, perspective views of an input device (500) are shown. As shown, the input device (500) is a keyboard and includes at least one key (505), and the at least one key (505) includes an array of OLED light elements. For example, in one or more embodiments, the array of OLED light elements of the at least one key (505) includes a first plurality of OLED light elements (507) disposed on a top surface (511) of the at least one key (505) and a second plurality of OLED light elements (508) disposed on a front surface (512) of the at least one key (505). In one or more embodiments, a lighting element (509) forms a part of the first plurality of light elements (507) and/or a part of the second plurality of light elements (508) and may be operatively connected to a controller, e.g., to the processing system (110) discussed above with reference to FIG. 1, which may be used to control which segments of the first plurality of light elements (507) and/or the second plurality of light elements (508) is activated and lighted. Although the at least one key (505) is segmented into ten segments on the top surface (511) by the first plurality of light elements (507) and is segmented into ten segments on the front surface (512) by the second plurality of light elements (508), the at least one key (505) may be segmented into more or less than ten segments according to embodiments disclosed herein. The lighting elements, e.g., the lighting element (509), disclosed herein that may be used to illuminate the light elements are not necessarily limited to OLEDs and may include LEDs and other lighting elements known in the art.

In one or more embodiments, the lighting element is used in part as the capacitive sensor. As such, in one or more embodiments, the lighting element of at least one of the first plurality of light elements (507) and/or the second plurality of light elements (508) may for a part of the sensing region, e.g., the sensing region (414) of FIG. 4, and may be used for touch sensing of contact of one or more input objects with the at least one key (505). Further, the lighting element of at least one of the first plurality of light elements (507) and/or the second plurality of light elements (508) may be used to illuminate a portion of the at least one key (505).

In one or more embodiments, the at least one key (505) may be partitioned into a plurality of segments, which may be denoted by the first plurality of light elements (507) and the second plurality of light elements (508). The partitioning of the at least one key (505) may allow a function to be activated by a processing system, e.g., the processing system 110 of FIG. 1, when one or more input objects interacts with a specific segment of the at least one key (505). For example, referring to FIG. 5B, a first function may be activated when one or more input objects interacts with a segment (507A) of the first plurality of OLED light elements (507) on the top surface (511) of the at least one key (505). Further, in one or more embodiments, a second function may be activated when one or more input objects interact with another segment of the first plurality of OLED light elements (507). Moreover, in one or more embodiments, a third function may be activated when one or more input objects interacts with a segment (508A) of the second plurality of OLED light elements (508) of the front surface (512) of the at least one key (505). Alternatively, in one or more embodiments, the first function may also be activated when one or more input objects interact with the segment (508A) of the second plurality of OLED light elements (508). Such configurations may be determined and/or modified by the user and/or by the program or application that the user operating.

According to embodiments disclosed herein, contact by one or more input objects, interaction by one or more input objects, contact by a user, contact by one or more input objects, input by a user, and input by one or more input objects may refer to "non-press touch input" or "contact input," as discussed above, to indicate input approximating a user contacting a key surface but not pressing the key surface sufficiently to cause a press input. A "press input" may indicate a user pressing a key surface sufficiently to trigger the main entry function of the key, e.g., in a downward direction or in the forward direction discussed above.

In one or more embodiments, the lighting element activates when there is input by a user in the sensing region. For example, as shown in FIG. 5B, the segment (508A) of the second plurality of light elements (508) is illuminated. In one or more embodiments, the segment (508A) of the second plurality of light elements (508) may become illuminated upon interaction by one or more input objects with the segment (508A) of the second plurality of light elements (508). Alternatively, in one or more embodiments, the segment (508A) of the second plurality of light elements (508)

may become illuminated upon interaction by one or more input objects with the segment (507A) of the first plurality of light elements (507).

Further, in one or more embodiments, the lighting element activates only at a particular location of the sensing region. In one or more embodiments, the lighting element indicates activation of operating system or graphical user interface commands. Further, in one or more embodiments, the lighting element provides indication of specific activation zones on the first surface. In one or more embodiments, the lighting element is further configured to provide visual feedback on the first surface and a second surface of the at least one key. Moreover, in one or more embodiments, the lighting element is configured to provide visual feedback on the second surface of the at least one key in response to positional information determined on the first surface of the at least one key. Furthermore, in one or more embodiments, the lighting element provides visual feedback to the user interacting with the at least one key through a front surface of the at least one key.

For example, still referring to FIG. 5B, interaction by one or more input objects with the segment (507A) of the first plurality of light elements (507) may result in illumination of only the segment (508A) of the second plurality of light elements (508) and not of the segment (507A) of the first plurality of light elements (507). Alternatively, in one or more embodiments, interaction by one or more input objects with the segment (507A) of the first plurality of light elements (507) may result in illumination of both the segment (508A) of the second plurality of light elements (508) and the segment (507A) of the first plurality of light elements (507). Alternatively, in one or more embodiments, the first plurality of light elements (507) on the top surface (511) of the at least one key (505) may provide visual cues for the user, e.g., illumination of one or more segments of the plurality of light elements (507), and the second plurality of light elements (508) of the front surface (512) of the at least one key (505) may provide touch sensing.

In one or more embodiments, both the top surface (511) and the front surface (512) of the at least one key (505) are not necessarily composed of light elements. For example, in one or more embodiments, the top surface (511) may be a surface having only a sensing region to sense a plurality of input objects and no lighting features, whereas the front surface (512) may include both a sensing region to sense a plurality of input objects as well as lighting features. Alternatively, in one or more embodiments, the front surface (512) of the at least one key may include only lighting features and no sensing region or vice versa.

In one or more embodiments, features of the at least one key (505) discussed herein may also be extended to other keys of the plurality of keys of the input device (500). For example, in one or more embodiments, other keys in a bottom-most row of a keyboard may include one or more sensing regions configured to sense a plurality of input objects, one or more capacitive sensors configured to determine positional information of the plurality of input objects, and/or a lighting element configured to provide visual feedback to a user interacting with these other keys. In one or more embodiments, any key of the input object (500) may include one or more icons which may be illuminated by a lighting element and may indicate a specific feature or function to a user.

Moreover, although the first plurality of light elements (507) forms a one-dimensional array, and the second plurality of light elements (508) also forms a one-dimensional array, in one or more embodiments, the top surface (511) and/or the front surface (512) of the at least one key (505) may include a two-dimensional array of light elements to enable X-Y positioning on the at least one key (505) using a matrix-pad style sensing scheme. In one or more embodiments, the entire light element array of the at least one key (505) may be integrated into a single substrate or may be formed from two separate substrates. In other words, in one or more embodiments, one substrate may be used for the light element array on the top surface (511) of the at least one key (505), e.g., the first plurality of light elements (507), and a separate substrate may be used for the array on the front surface (512) of the at least one key (505), e.g., the second plurality of light elements (508). Alternatively, in one or more embodiments, a single substrate may be used to form both the first plurality of light elements (507) and the second plurality of light elements (508).

In one or more embodiments, white-colored OLEDs may be used for both the first plurality of light elements (507) and/or the second plurality of light elements (508) of the at least one key (505). Alternatively, in one or more embodiments, light elements may be made from other colors to enhance the user experience of the user by further differentiating between specific functions or features indicated on the at least one key (505). In one or more embodiments, a single OLED light element may be made from a tri-color array of subpixels, such that each OLED light element may have a programmable color.

One or more interactions between a user and a program or application may be shown by the plurality of light elements on the at least one key (505). For example, in one or more embodiments, one or more light elements of the first plurality of light elements (507) and/or the second plurality of light elements (508) may illuminate whenever a user touches the at least one key (505). Further, in one or more embodiments, the array of light elements, which includes the first plurality of light elements (507) and/or the second plurality of light elements (508), may toggle on/off when a user touches the at least one key (505). In one or more embodiments, individual light elements in the array may illuminate whenever one or more input objects is touching that particular light element panel, which may provide visual feedback to the user. Moreover, in one or more embodiments, illumination of one or more light elements may indicate a particular touch region of the at least one key (505), and illumination of one or more light elements may show the different touch regions that are available on the at least one key (505). For example, activation of a specific touch region of the at least one key (505), which may include a non-press input touch of the specific touch region of the at least one key (505) and press input of the at least one key (505) by the user, may result in a preset operation. For example, in one or more embodiments, non-press input touch of the segment (507A) of the first plurality of light elements (507) may indicate to the processing system to launch a web browser on a GUI. Alternatively, in one or more embodiments, non-press input touch of the segment (507A) of the first plurality of light elements (507) and press input of the at least one key (505) may indicate to the processing system to launch a web browser on the GUI.

In one or more embodiments, a particular action is executed within a GUI based on the initial position and the terminal position of the plurality of input objects on the first surface of the input device. In one or more embodiments, a sensing region, e.g., the sensing region (414) of FIG. 4, of the top surface (511) and/or the front surface (512) of the at least one key (505) may allow a user to control the volume of a host device. For example, the at least one key (505) may act as a relative sliding volume control, e.g., sliding an input object from an initial position on a right side of the at least one key (505) to a terminal position on a left side of the at least one key (505) may decrease volume, whereas sliding the input object from left to right may increase volume on the host device. In this example, one or more OLED light elements of the first plurality of OLED light elements (507) and/or the second plurality of OLED light elements (508) may illuminate to correspond to the current volume level of the host device. For example, in a minimum volume situation, only the leftmost light element in the first plurality of light elements (507) and/or the second plurality of light elements (508) may be illuminated, whereas, in a maximum volume situation, all of the light elements in the first plurality of light elements (507) and/or the second plurality of light elements (508) may be illuminated.

Similarly, in one or more embodiments, the at least one key (505) may be used to implement existing publicized features such as scrolling or IME candidate character selection. For example, in one or more embodiments, illumination of one or more light elements in the first plurality of light elements (507) and/or the second plurality of light elements (508) may be used to provide visual feedback for the user's location in a window while scrolling up/down or left/right or in the candidate character's position with a selection menu. For example, sliding an input object, e.g., a user's finger, along the sensing region of the at least one key (505) scrolls a window shown by the GUI either up/down or left/right. In this interaction, a position of a single illuminated light element of the at least one key (505) moves to encode the user's relative position along the object that is being scrolled. Moreover, in one or more embodiments, illumination of more or more light elements in the first plurality of light elements (507) and/or the second plurality of light elements (508) may be used as a progress bar to indicate the percentage-complete for an installation of a program or application.

Further, in one or more embodiments, the positional information of the plurality of input objects includes an initial position and a terminal position on the first surface of the input device. For example, the illumination one or more light elements in the first plurality of light elements (507) and/or the second plurality of light elements (508) of the at least one key (505) may also be used to indicate relative object sizing in a pinch-zoom operation. For example, in one or more embodiments, the sensing region of at least one key (505), e.g., on the top surface (511) and/or the front surface (512), may be used for a pinch-zoom operation, such that a user may slide a plurality of input objects, e.g., two fingers, toward each other or away from each other along the at least one key (505). During this pinch-zoom gesture, the position of two illuminated light elements encodes the relative size of the object being zoomed. For example, as the object of interest enlarges on the GUI, the spacing between the two illuminated light elements increases.

In one or more embodiments, one or more keys other than the at least one key of input device may serve as a modal switch. For example, referring now to FIG. 6, a top view of an input device (600) having at least one key (605) and a mode switch key (606) according to embodiments disclosed herein is shown with input objects (640A) and (640B). In one or more embodiments, the mode switch key (606) may be a key that may be pressed or held down by one or more input objects, e.g., the input object (640B), prior to any gesturing on the at least one key (605) by one or more input objects, e.g., the input object (640A), to change the function performed. Toggling the mode switch key (606) between an unpressed position and a pressed position may switch the at least one key (605) from its usual functionality to an alternative functionality in one or more embodiments. For example, in one or more embodiments, non-press input touch of a first segment of a first surface of the at least one key (605) may trigger a first function by the processing system and/or program or application. However, upon pressing and holding of the mode switch key (606) during the non-press input touch of the first segment of the first surface of the at least one key (605), a second function may be triggered by the processing system and/or program or application. Similar toggling between specific functions described above may also apply to press input of the at least one key (605) by a user in one or more embodiments. Further, in one or more embodiments, multiple modes may be achieved in implementations that allow for multiple mode switching methods. For example, in one or more embodiments, the input device (600) in which multiple keys are designated as a mode switch key, e.g., by the processing system and/or by a program or application, may allow for multiple modes of the at least one key (605).

Figure 6:
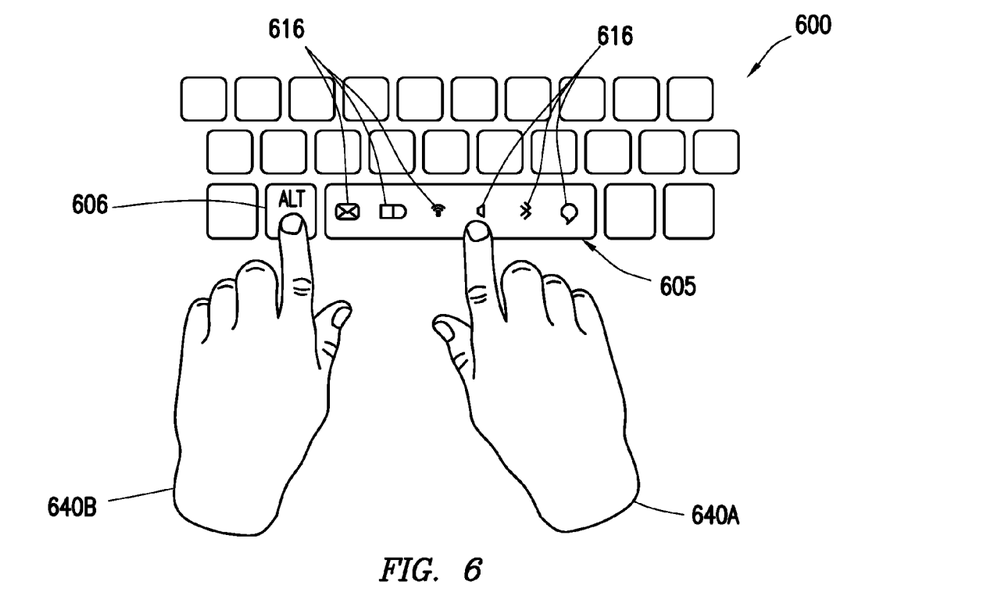
FIG. 6 is a top view of an example input device in accordance with one or more embodiments of the invention.

Further, in one or more embodiments, the at least one key may include one or more dead-faced icons graphics and underlying lighting elements. For example, as shown in FIG. 6, the at least one key (605) includes a plurality of dead-faced icon graphics (616) thereon. In one or more embodiments, the plurality of icon graphics (616) may be disposed on a top surface, e.g., the top surface (511) of FIGS. 5A and 5B, and/or a front surface, e.g., the front surface (512) of FIGS. 5A and 5B. Further, in one or more embodiments, the at least one key (605) may include one or more underlying lighting elements disposed therein to illuminate specific icon graphics (616) for the user to see while leaving other icon graphics (616) unilluminated and difficult to see by the user when unilluminated. For example, in one or more embodiments, capacitive sensing for the at least one key (605) may be implemented on a printed circuit board (PCB) that also contains surface mounted LEDs, multi-colored LEDs, OLEDs, and/or a small display. In one or more embodiments, a mechanical light guide may pip the LED lighting to illuminate specific icon graphics (616) that have been drawn into a surface of the at least one key (605), as shown in FIG. 6. Alternatively, in one or more embodiments, an LED without icons may be used to highlight a touch region, as discussed above.

In one or more embodiments, one or more of the icon graphics (616) of the at least one key (605) may be used to indicate the status and/or the mode of the at least one key (605). For example, illumination of one or more of the icon graphics (616) may indicate to a user whether the input device (600) is in a default input mode or in an alternate input mode based on the toggling of the mode switch key (606). Further, in one or more embodiments, one or more of the icon graphics (616) of the at least one key (605) may be used to indicate various notifications based on the state of host device software. For example, one of the icon graphics (616) may be a mail icon that illuminates when mail is received by an email program, and pressing the mode switch key (606) while pressing the portion of the at least one key (605) corresponding to the mail icon may activate the requisite email program and show the email program on a display. As discussed above, the at least one key (605) may include a capacitive sensor included therein to determine positional information of a plurality of input objects, which may allow such a specific function such as activating an email program to occur when the portion of the at least one key (605) corresponding to the mail icon is contacted or pressed.

In one or more embodiments, illumination of one or more icon graphics (616) may be used to indicate to a user who is logged into a shared computer, and a modal switch may be used to enable a user to press the portion of the at least one key (605) with the icon illuminated to switch to another user. In one or more embodiments, illumination of one or more icon graphics (616) may be used to indicate the status of the computer. For example, illumination of one or more icon graphics (616) may be used to indicate whether the computer is in high performance, lower power, sleep, or hibernate mode. In one or more embodiments, touching the portion of the at least one key (605) having the respective illuminated icon graphic upon a modal switch may allow a user to quickly put the computer into the respective mode indicated by the icon graphic. Moreover, in one or more embodiments, one or more icon graphics (616) of the at least one key (605) may be used to indicate CPU load, and a modal press of the at least one key (605) may open the host device's operating system's task bar.

In one or more embodiments, one or more icon graphics (616) of the at least one key (605) may be used to indicate frequent callers or email senders of the user. In one or more embodiments, modal press of the at least one (605) may open the requisite telephone/video/email program in the GUI or bring the program to the forefront. Further, in one or more embodiments, one or more icon graphics (616) of the at least one key (605) may be used to indicate unread emails, provide a stock ticker, clock, weather on a display of the at least one key (605), in which modal press of the at least one (605) in the appropriate portion would launch the requisite program or application. Furthermore, a display of the at least one key (605) may be used instead of the main display, e.g., instead of the display (201) of FIG. 2, during the installation of an operating system, during boot-up, or when the host device needs to shut-down/hibernate due to low battery. In one or more embodiments, the display of the at least one key (605) may need to be supported in the host device's BIOS and could help preserve battery life because the display of the at least one key (605) may require less power to function than the main display of the host device.

In one or more embodiments, the at least one key comprises a first key and a second key. For example, referring to FIG. 7, a top view of an input device (700) having at least one key that is bifurcated into a first key (705A) and a second key (705B) according to embodiments disclosed herein is shown with input objects (740A) and (740B). In one or more embodiments, the at least one key may be a bifurcated space bar including the first key (705A) and the second key (705B), e.g., such as in a natural or ergonomic keyboard. In one or more embodiments, each of the first key (705A) and the second key (705B) may include a first surface configured to contact a plurality of input objects, e.g., the input objects (740A) and/or (740B), a sensing region configured to sense the plurality of input objects, a capacitive sensor configured to determine positional information of the plurality of input objects, and a lighting element configured to provide visual feedback to a user interacting with each of the first key (705A) and the second key (705B). In one or more embodiments, each of the first key (705A) and the second key (705B) may include all of the functionality and features discussed above with regard to the at least one key (405) of FIG. 4, the at least one key (505) of FIGS. 5A and 5B, and the at least one key (605) of FIG. 6.

Figure 7:
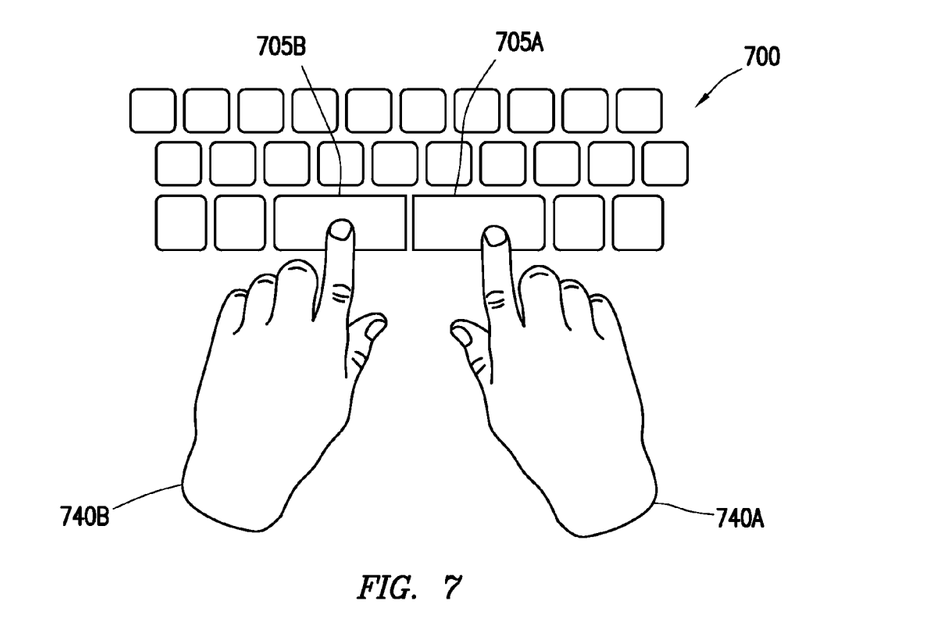
FIG. 7 is a top view of an example input device in accordance with one or more embodiments of the invention.

In one or more embodiments, having the first key (705A) and the second key (705B) may allow a processing system and/or an application or program of a host device to easily and unambiguously differentiate between vertical and horizontal scrolling functions. For example, in one or more embodiments, moving an input object, e.g., the input object (740A), from left to right and right to left along the first key (705A) may be used to allow a user to scroll horizontally within a program window, whereas moving an input object, e.g., the input object (740B), from left to right and right to left along the second key (705B) may be used to allow a user to scroll vertically within the program window.

Moreover, in one or more embodiments, functions performed by non-press contact and/or press contact with the first key (705A) may be substantially similar to those functions performed by non-press contact and/or press contact with the second key (705B). However, in one or more embodiments, the functions when performed through interaction with the first key (705A) may be exaggerated when compared to that when performed through interaction with the second key (705B). For example, in one or more embodiments, moving an input object from left to right and from right to left may result in horizontal scrolling for both the first key (705A) and the second key (705B). However, in one or more embodiments, moving an input object from left to right and from right to left on the first key (705A) may result in faster horizontal scrolling when compared to the same left to right or right to left movement of an input object on the second key (705B). Having multiple keys with positional detection features as discussed above, such as the first key (705A) and the second key (705B), also provides clear differentiation between separate touch regions to a user when compared to, for example, a single key having multiple touch regions formed thereon, e.g., the at least one key (505) shown in FIGS. 5A and 5B having ten segments formed thereon that correspond to ten separate functions.

One or more embodiments are directed to a processing system for an input device. According to one or more embodiments, the processing system includes a sensor module comprising circuitry coupled to a capacitive sensor, the sensor module configured to transmit transmitter signals and receive resulting signals with the capacitive sensor. The processing system also includes a determination module comprising circuitry configured to determine positional information for a plurality input objects contacting a first surface of an input device. In one or more embodiments, the determination module is configured to determine positional information of the plurality of input objects and to activate a lighting element of the input device to provide visual feedback to a user interacting with input device based on the positional information of the plurality of input objects.

For example, referring back generally to FIG. 1 and FIG. 4, the processing system (110) includes a sensor module (160) comprising circuitry, as discussed above, coupled to a capacitive sensor (415). In one or more embodiments, the sensor module (160) is configured to transmit transmitter signals and receive resulting signals with the capacitive sensor (415). In one or more embodiments, the processing system (110) also includes a determination module (150) comprising circuitry, as discussed above, configured to determine positional information for a plurality input objects (140) contacting a first surface, e.g., the top surface (411), of an input device, e.g., the at least one key (405) of the input device (400).

In one or more embodiments, the determination module is configured to determine positional information of the plurality of input objects and to activate a lighting element of the input device to provide visual feedback to a user interacting with input device based on the positional information of the plurality of input objects. For example, referring generally to FIG. 1 and FIG. 5B, the determination module (150) is configured to determine positional information of the plurality of input objects (140) and to activate a lighting element (509) of the input device (500) to provide visual feedback to a user interacting with input device (500) based on the positional information of the plurality of input objects (140).

In one or more embodiments, activating the lighting element includes activating the lighting element only at a particular location of the first surface of the input device based on the positional information of the plurality of input objects. For example, as shown in FIG. 5B, the lighting element (509) is activated only at a particular location, e.g., only the segment (508A) of the second plurality of light elements is illuminated, of the first surface of the input device (500) based on the positional information of a plurality of input objects. As shown, the first surface of the input device (500) may be considered to be the front surface (512) of the at least one key (505). However, in one or more embodiments, the first surface of the input device (500) may be considered to be the top surface (511) of the at least one key (505).

One or more embodiments is directed to an electronic system. According to one or more embodiments, the electronic system includes a display device configured to display a graphical user interface, an input device comprising at least one key and a capacitive sensor operatively connected to a first surface of the at least one key having a sensing region, and a processing system communicatively coupled to the display device and the input device.

For example, referring generally to FIG. 1, FIG. 2, and FIG. 4, the electronic system may include the input device (100), (400) and may include the display device (201) configured to display the GUI (202). As discussed above, the input device (400) may include at least one key (405) and a capacitive sensor (415) operatively connected to a first surface, e.g., to at least one of the top surface (411) and/or the front surface (412), of the at least one key (405) having a sensing region (414), and a processing system (110) communicatively coupled to the display device (201) and the input device (400).

In one or more embodiments, the processing system is configured to determine positional information of a plurality of input objects on the first surface of the at least one key and to activate a lighting element to provide visual feedback to a user interacting with the at least one key based on the positional information of the plurality of input objects.

For example, as discussed above with reference to FIG. 1 and FIG. 5B, the processing system (110) is configured to determine positional information of a plurality of input objects (140) on the first surface, e.g., the top surface (511) and/or the front surface (512), of the at least one key (505) and to activate a lighting element (509) to provide visual feedback to a user interacting with the at least one key (505) based on the positional information of the plurality of input objects (140).

In one or more embodiments, the lighting element indicates activation of commands of an operating system or the GUI. Further, in one or more embodiments, the electronic system is configured to display an interface action menu within the GUI in response to the positional information of the plurality of input objects. For example, referring back to FIG. 2 and FIG. 5B, activation of a specific touch region of the at least one key (505), which may include a non-press input touch of the specific touch region of the at least one key (505) and press input of the at least one key (505) by the user, may result in a preset operation. For example, in one or more embodiments, non-press input touch of the segment (507A) of the first plurality of light elements (507) may indicate to the processing system to launch a web browser on the GUI (202). Alternatively, in one or more embodiments, non press input touch of the segment (507A) of the first plurality of light elements (507) and press input of the at least one key (505) may indicate to the processing system to launch a web browser on the GUI (202).

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

Thus, while the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An input device comprising:
   a plurality of keys;
   at least one key of the plurality of keys comprising:
     a first surface configured to contact an input object;
     a sensing region comprising a plurality of touch regions along the first surface;
     a capacitive sensor configured to determine positional information corresponding to the plurality of touch regions; and
     a first lighting element and a second lighting element,
     wherein the input object contacting a first touch region of the plurality of touch regions is configured to activate the first lighting element and trigger a first key function,
     wherein the input object contacting a second touch region of the plurality of touch regions is configured to activate the second lighting element and trigger a second key function that is different from the first key function, and
     wherein, in response to the at least one key being in a pressed position, the at least one key is configured to trigger a third key function that is different from the first key function and the second key function.

2. The input device of claim 1, wherein the first lighting element is used in part as the capacitive sensor.

3. The input device of claim 1, wherein the first lighting element indicates activation of operating system or graphical user interface commands.

4. The input device of claim 1, wherein the first lighting element and the second lighting element are further configured to provide visual feedback on the first surface and a second surface of the at least one key.

5. The input device of claim 4, wherein the first lighting element is configured to provide visual feedback on the second surface of the at least one key in response to positional information determined on the first surface of the at least one key.

6. The input device of claim 4, wherein the capacitive sensor is configured to determine positional information of the input object on both the first surface and the second surface of the at least one key.

7. The input device of claim 1, wherein the first surface is a front surface of the at least one key.

8. The input device of claim 1, wherein the first lighting element comprises an organic light-emitting diode.

9. The input device of claim 1, wherein the first lighting element provides visual feedback to the user interacting with the at least one key through a front surface of the at least one key.

10. A processing system for an input device, the processing system comprising:
- a sensor module comprising first circuitry coupled to a capacitive sensor disposed in a key among a plurality of keys, wherein the key comprises a surface, a sensing region comprising a plurality of touch regions along the surface, wherein the sensor module is configured to transmit transmitter signals and receive resulting signals with the capacitive sensor; and
- a determination module comprising second circuitry configured to determine positional information corresponding to a location of an input object among the plurality of touch regions, wherein the determination module is configured to:
    - determine the positional information,
    - activate, in response to the positional information, a first lighting element when the input object contacts a first touch region of the plurality of touch regions,
    - activate, in response to the positional information, a second lighting element when the input object contacts a second touch region of the plurality of touch regions,
    - trigger, in response to the input object contacting the first touch region, a first key function,
    - trigger, in response to the input object contacting the second touch region, a second key function that is different from the first key function, and
    - trigger, in response to the key being in a pressed position, a third key function that is different from the first key function and the second key function.

11. The processing system of claim 10, wherein the positional information comprises an initial position and a terminal position on the first surface of the input object.

12. The processing system of claim 10, wherein a particular action is executed within a graphical user interface based on the initial position and the terminal position of the input object on the first surface.

13. An electronic system comprising: a display device configured to display a graphical user interface; an input device comprising at least one key and a capacitive sensor operatively connected to a surface of the at least one key having a sensing region comprising a plurality of touch regions along the surface; and a processing system communicatively coupled to the display device and the input device, the processing system configured to: determine positional information corresponding to a location of an input object among the plurality of touch regions, activate, in response to the positional information a first lighting element when the input object contacts a first touch region of the plurality of touch regions, and activate, in response to the positional information, a second lighting element when the input object contacts a second touch region of the plurality of touch regions, trigger, in response to the input object contacting the first touch region, a first key function, trigger, in response to the input object contacting the second touch region, a second key function that is different from the first key function, and trigger, in response to the at least one key being in a pressed position, a third key function that is different from the first key function and the second key function.

14. The electronic system of claim 13, wherein the first lighting element indicates activation of commands of an operating system or the graphical user interface.

15. The electronic system of claim 13, wherein the display device is further configured to display an interface action menu within the graphical user interface in response to the positional information.

* * * * *